(12) United States Patent
Wilkes

(10) Patent No.: US 8,945,459 B2
(45) Date of Patent: Feb. 3, 2015

(54) CONTAINER MADE FROM EXPANDED PLASTIC FILM

(75) Inventor: Kenneth R. Wilkes, Asheville, NC (US)

(73) Assignee: Smart Bottle Inc., Asheville, NC (US)

( * ) Notice: Subject to any disclaimer, the term of this patent is extended or adjusted under 35 U.S.C. 154(b) by 963 days.

(21) Appl. No.: 12/237,214

(22) Filed: Sep. 24, 2008

(65) Prior Publication Data

US 2010/0072679 A1  Mar. 25, 2010

(51) Int. Cl.
| | | |
|---|---|---|
| *B29C 49/00* | (2006.01) | |
| *B29C 49/02* | (2006.01) | |
| B29C 65/02 | (2006.01) | |
| B29C 65/08 | (2006.01) | |
| B29C 65/48 | (2006.01) | |
| B29C 65/00 | (2006.01) | |
| B29C 49/46 | (2006.01) | |

(52) U.S. Cl.
CPC ............ *B29C 49/0073* (2013.01); *B29C 49/02* (2013.01); *B29C 65/02* (2013.01); *B29C 65/08* (2013.01); *B29C 65/48* (2013.01); *B29C 66/1122* (2013.01); *B29C 66/43* (2013.01); *B29C 2049/4638* (2013.01)
USPC ....................................................... 264/529

(58) Field of Classification Search
USPC .......................................... 264/528, 529, 89
See application file for complete search history.

(56) References Cited

U.S. PATENT DOCUMENTS

| | | |
|---|---|---|
| 3,072,959 A | 1/1963 | Leeds et al. |
| 3,160,999 A | 12/1964 | Lee |
| 4,079,850 A | 3/1978 | Suzuki et al. |
| 4,118,452 A * | 10/1978 | Myers et al. .................. 264/529 |
| 4,415,085 A | 11/1983 | Clarke et al. |
| 4,484,904 A | 11/1984 | Fowler |
| 5,338,117 A | 8/1994 | Kucksdorf et al. |
| 5,366,791 A | 11/1994 | Carr et al. |
| 5,567,296 A | 10/1996 | Luch |
| 5,637,167 A | 6/1997 | Krishnakamur et al. |
| 5,669,208 A | 9/1997 | Tabaroni et al. |
| 5,743,988 A | 4/1998 | Accorsi |
| 5,971,613 A | 10/1999 | Bell |
| 6,116,440 A | 9/2000 | Zaksenberg et al. |
| 6,126,315 A | 10/2000 | Ichikawa et al. |
| 6,395,357 B1 | 5/2002 | Abu-Isa |
| 6,667,081 B1 | 12/2003 | Aoki et al. |

(Continued)

FOREIGN PATENT DOCUMENTS

| | | |
|---|---|---|
| EP | 0854092 A2 | 7/1998 |
| JP | 05016938 | 1/1993 |

(Continued)

*Primary Examiner* — Larry Thrower
(74) *Attorney, Agent, or Firm* — Clark Hill PLC

(57) ABSTRACT

A plastic film preform is expanded to form a container. The preform has a longitudinal axis that extends from an open top to a closed bottom. The preform is pressurized with a first pressure sufficient to cause side walls of the preform to expand outwardly and the bottom of the preform to be drawn inwardly thereby reducing a length of the preform along the longitudinal axis. Side molds are closed around the side walls of the preform, the closed side molds being larger than the expanded side walls. A bottom mold is closed to be adjacent to the bottom of the preform after pressurizing the preform with the first pressure. The preform is pressurized with a second pressure sufficient to expand the preform to fill the closed molds. The preform is thereby significantly stretched in a direction perpendicular to the longitudinal axis and minimally stretched along the longitudinal axis.

8 Claims, 3 Drawing Sheets

(56) References Cited

U.S. PATENT DOCUMENTS

| | | | |
|---|---|---|---|
| 6,695,757 B2 | 2/2004 | Edwards et al. | |
| D489,993 S | 5/2004 | Wilkes | |
| 6,832,852 B2 * | 12/2004 | Wilkes | 383/120 |
| 6,984,354 B2 | 1/2006 | Shelby et al. | |
| 7,147,597 B2 | 12/2006 | Wilkes | |
| 7,407,326 B2 | 8/2008 | Wilkes | |
| 2002/0031627 A1 | 3/2002 | Van Schaftingen | |
| 2002/0172788 A1 | 11/2002 | Chan et al. | |
| 2002/0190108 A1 | 12/2002 | Hermodsson | |
| 2006/0120634 A1 | 6/2006 | Bianchini | |
| 2006/0266728 A1 | 11/2006 | Wilkes | |
| 2010/0072679 A1 * | 3/2010 | Wilkes | 264/528 |

FOREIGN PATENT DOCUMENTS

| | | |
|---|---|---|
| JP | 9104445 | 4/1997 |
| JP | 11091014 | 4/1999 |
| JP | 2001240083 | 9/2001 |
| JP | 2003002341 | 1/2003 |

* cited by examiner

CONTAINER MADE FROM EXPANDED PLASTIC FILM

BACKGROUND

1. Field

Embodiments of the invention relate to the field of containers including bottles and jars; and more specifically, to such containers made by expanding plastic films.

2. Background

The billions of pounds of plastic products and packaging produced in this country every year create numerous concerns. At every step in the production of plastics, resources are consumed and waste is produced. Plastics are made from finite, nonrenewable petroleum and natural gas raw materials. Reducing the amount of plastic needed to make a plastic container, such as a bottle or jar, has many benefits.

While the amount of plastic used in making a plastic container can be reduced by thinning the walls of the container, this can create structural problems with the container. Thin walls also increase the oxygen permeability of the container. That may adversely affect the ability of the container to protect and preserve the contents, particularly for foodstuffs.

Container can be made from plastic films which offer the possibility of producing containers with very thin walls that provide a good oxygen barrier. However, making containers from plastic films creates a number of structural challenges.

It would be desirable to have a method for producing containers, such as bottles and jars, with thin walls having low oxygen permeability.

SUMMARY

A plastic film preform is expanded to form a container. The preform has a longitudinal axis that extends from an open top to a closed bottom. The preform is pressurized with a first pressure sufficient to cause side walls of the preform to expand outwardly and the bottom of the preform to be drawn inwardly thereby reducing a length of the preform along the longitudinal axis. Side molds are closed around the side walls of the preform, the closed side molds being larger than the expanded side walls. A bottom mold is closed to be adjacent to the bottom of the preform after pressurizing the preform with the first pressure. The preform is pressurized with a second pressure sufficient to expand the preform to fill the closed molds. The preform is thereby significantly stretched in a direction perpendicular to the longitudinal axis and minimally stretched along the longitudinal axis.

Other features and advantages of the present invention will be apparent from the accompanying drawings and from the detailed description that follows below.

BRIEF DESCRIPTION OF THE DRAWINGS

The invention may best be understood by referring to the following description and accompanying drawings that are used to illustrate embodiments of the invention by way of example and not limitation. In the drawings, in which like reference numerals indicate similar elements.

DETAILED DESCRIPTION

In the following description, numerous specific details are set forth. However, it is understood that embodiments of the invention may be practiced without these specific details. In other instances, well-known structures and techniques have not been shown in detail in order not to obscure the understanding of this description.

Embodiments of the present invention provide a container made largely from a plastic film and thereby substantially reducing the amount of plastics in the container. The films may be chosen to provide a good oxygen barrier. The structure of the container provides for a container that is stable when filled and amenable to an attractive design treatment.

Film as used herein refers to a thin, generally flexible, sheet of plastic suitable for packaging. The film may be of organic polymers that can be classified by how permeable they are to gases (e.g., oxygen or carbon dioxide) and moisture vapor. Those organic polymers that significantly restrict the ability of gases to pass through them are referred to as gas barrier polymers or high barrier polymers. The use of high barrier polymers is very important in the packaging of certain foods and beverages, which require protection from oxygen and moisture. Vinylidene chloride based polymers (PVDC) and copolymers are examples of suitable high barrier polymers for films for use in the present invention. Perhaps the most familiar examples of the vinylidene chloride based polymers used in packaging are commercial Saran® products. Other high oxygen barrier polymers may be used, such as ethylene vinyl alcohol (EVOH) copolymers. However, EVOH copolymers lack the moisture resistance properties associated with vinylidene chloride based polymers, and therefore, EVOH copolymers may be combined with additional moisture barrier polymers for use in the present invention. Packaging comprising high gas barrier polymers, such as PVDC and EVOH, may be inadequate to protect certain packaged oxygen sensitive products, such as beer and juice, from environmental oxygen. Modified organic polymers may be used in the present invention to enhance oxygen barrier properties. Modifications may include chemical modification of organic polymers, such as fluoridation or sulfonation of organic polymers.

Figure 1:
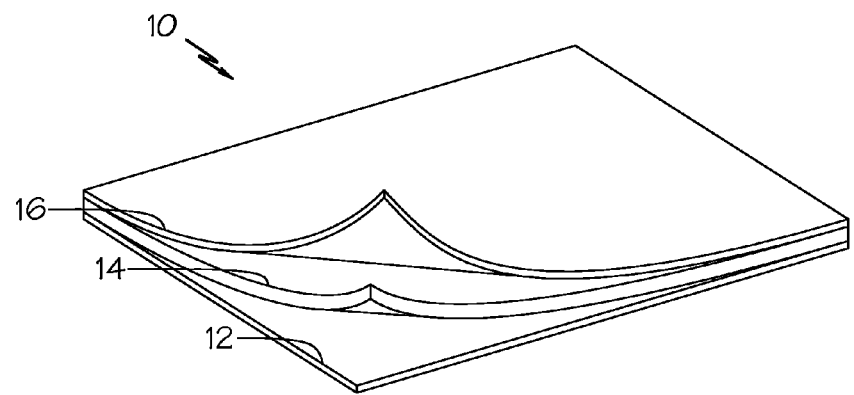
FIG. 1 is a perspective view of a laminate film that may be used in an embodiment of the present invention.

The film used in the present invention may be a laminate of several component films selected to provide a combination of desirable properties. For example, as shown in FIG. 1, the laminate film 10 may include a film layer 12 chosen to provide good seaming qualities for joining sheets. Another included film layer 14 may be a high barrier layer, perhaps opaque and located within the laminate. Another included film layer 16 may be an "overwrap" layer that forms the exterior surface of the container and provides a protective and attractive surface.

Embodiments of the invention expand a preform made from plastic film to form a container. The preform has a longitudinal axis that extends from an open top to a closed bottom. The preform may include a molded fitment that is joined to the plastic film to create the open top. Suitable preforms for use in embodiments of the present invention may be made according to the disclosures of U.S. Pat. Nos. 6,832,852, 7,147,597, and 7,407,326, each of which is hereby incorporated herein by reference.

Figure 2:
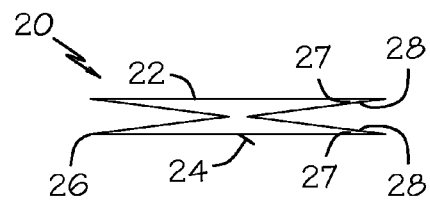
FIG. 2 is an end view of a plastic tube formed by folding and seaming a sheet of plastic.

FIG. 2 shows an end view of a plastic tube 20 formed by folding and seaming a sheet of plastic 22. The seam 24 may be formed by any means that bonds the adjacent edges of the plastic sheet, such as heat welding, ultrasonic welding, or adhesive bonding. The sheet 22 may be folded so that an expandable preform can be fabricated from the tube 20.

Figure 3:
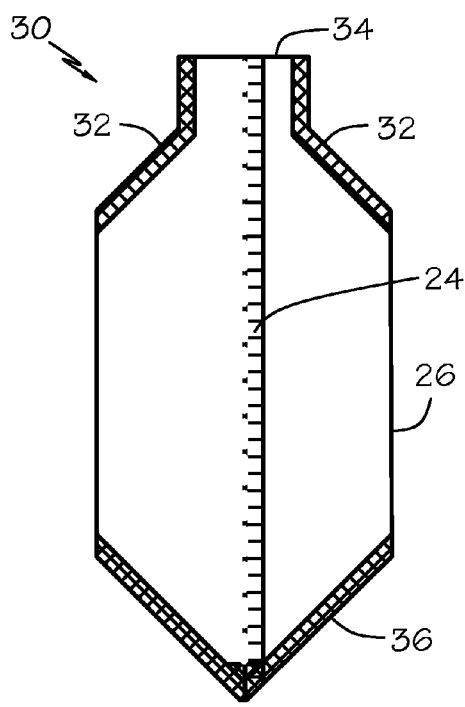
FIG. 3 shows a plan view of a preform that may be formed from the plastic tube shown in FIG. 2.

FIG. 3 shows a plan view of a preform 30 that may be formed from a plastic tube 20 such as the one shown in FIG. 2. The tube 20 may be seamed together to form a top end with tapered seams 32 that define an open end 34. The tube 20 may be further seamed together to form a closed bottom end with a tapered seam 36. The seaming bonds the facing interior surfaces 27 of the tube 20 while leaving the facing exterior surfaces 28 of the tube unbonded so that the resulting preform can be expanded. The preform has a longitudinal axis that extends from the open top 34 to the closed bottom 36.

Figure 4:
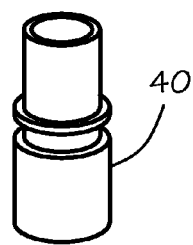
FIG. 4 shows a fitment that may provide a closure for a container made from the preform shown in FIG. 3.

FIG. 4 shows a fitment 40 that may provide a closure for a container made from the preform. The fitment may include threads to receive a closure such as a bottle cap or other means of closing the container.

Figure 5:
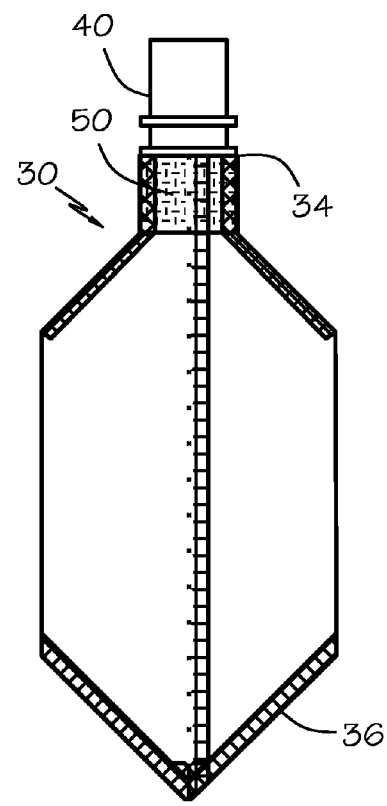
FIG. 5 shows the fitment of FIG. 4 bonded to the preform of FIG. 3.

FIG. 5 shows the fitment 40 bonded to the opening 34 of the preform 30 of FIG. 3. The fitment 40 may be inserted into the opening 34 from the bottom end of the preform before the bottom end is closed by the seam 36.

Figure 6:
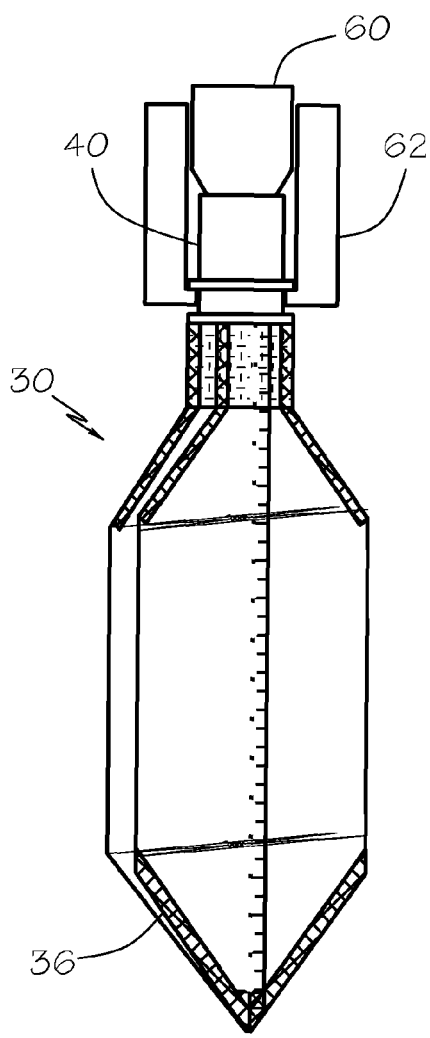
FIG. 6 shows a portion of a machine that embodies the invention with a preform.

FIG. 6 shows a portion of a machine that embodies the invention for expanding a preform 30 made from plastic film 20 to form a container. FIG. 6 shows a filler 60 that engages and seals the open top 34 of the preform 30. In the embodiment shown, the filler 60 engages and seals the fitment 30 and thereby engages and seals the open top 34. Grippers 62 may engage the fitment 40, such as by engaging a groove in the fitment, to press the fitment into a pressure tight engagement with the filler 60. The filler may include a resilient surface to facilitate forming a pressure tight seal between the open end of the preform and the filler.

Figure 7:
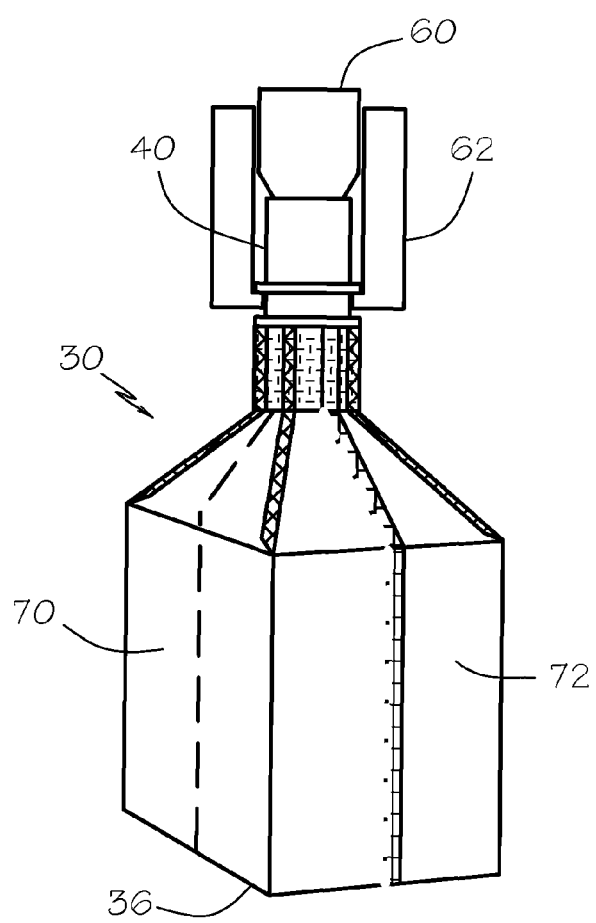
FIG. 7 shows the machine of FIG. 6 with the preform after being pressurized.

As shown in FIG. 7, the filler 60 pressurizes the preform 30 with a first pressure sufficient to cause side walls 70, 72 of the preform to expand outwardly and the bottom 36 of the preform to be drawn inwardly. The pressurization of the preform 30 thereby reduces a length of the preform along the longitudinal axis.

Figures 8A, 8B:
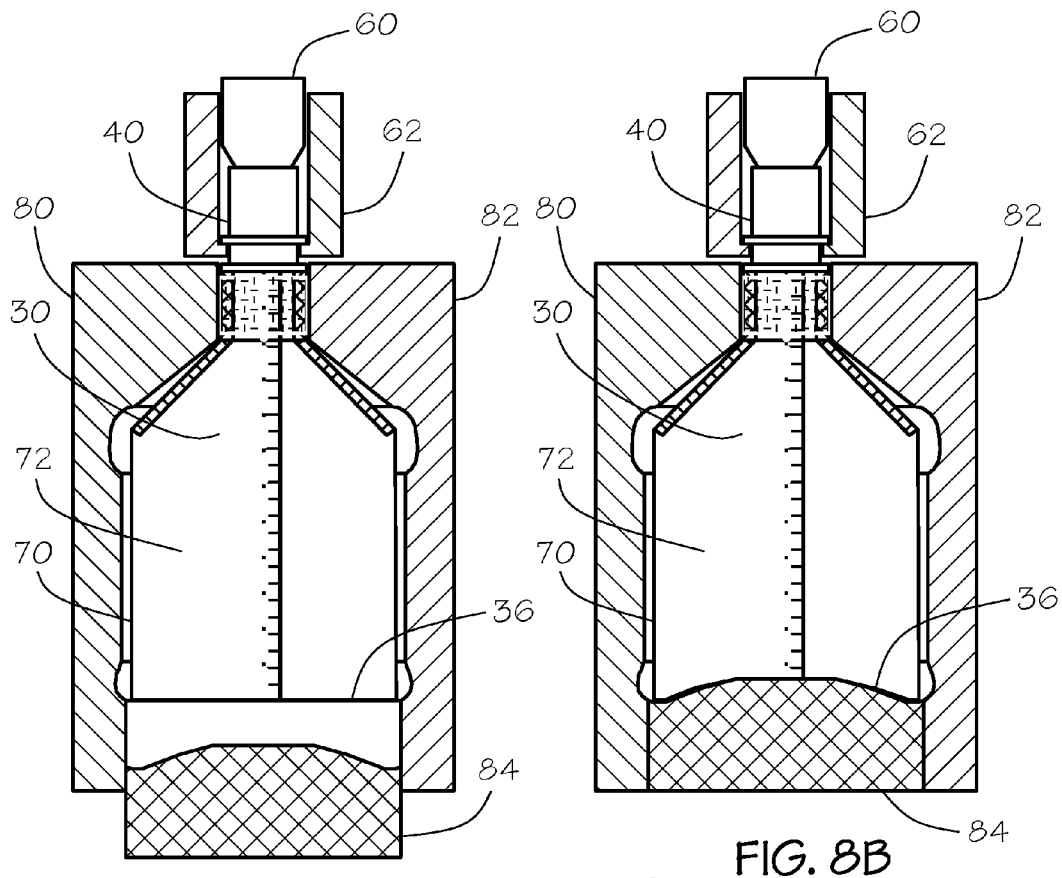
FIG. 8A is a cross-section of additional portions of a machine that embodies the invention with a preform with a bottom mold in an open position.
FIG. 8B is a cross-section of additional portions of a machine that embodies the invention with a preform with a bottom mold in a closed position.

As shown in the cross-sections of FIGS. 8A and 8B, a machine that embodies the invention includes side molds 80, 82 and a bottom mold 84. While the side molds 80, 82 are shown as two parts and the bottom mold is shown as a single part 84, it will be appreciated that the molds may be provided in other numbers within the scope of the invention. When the molds 80, 82, 84 are closed around the preform as shown in FIG. 8B, they define a cavity having the desired shape of the container to be formed. It is significant that the side molds 80, 82 define a volume that is somewhat larger than the preform 30 while the bottom mold is closely adjacent to the bottom 36 of the preform.

Unlike conventional blow molding of containers in which a preform is stretched biaxially to increase both the diameter and the length of the preform, it has been found that a film preform that embodies the invention should be stretched to expand the diameter while stretching along the longitudinal axis should be minimized. It will be appreciated that a film preform is stretched much less than a conventional blow molded preform even in diameter because the film preform provides much thinner walls.

It will be appreciated that the side molds 80, 82 may be closed around the preform 30 before, after, or during the pressurization of the preform 30 with the first pressure. The closed side molds 80, 82 are larger than the expanded side walls. However, it is necessary that the first pressure be applied to the preform 30 before the bottom mold 84 is closed against the bottom 36 of the preform as shown in FIG. 8B. The pressurization of the preform 30 with the first pressure causes the bottom 36 of the preform to be drawn inwardly and thereby reduces the length of the preform along the longitudinal axis.

Closing the bottom mold 84 may creates a mold cavity having a length that is substantially the same as the reduced length of the preform 30 along the longitudinal axis. The bottom mold 84 may touch the bottom of the expanded preform or be slightly separated from the bottom, perhaps by about 0.25 of an inch (7 mm).

After closing the side 80, 82 and bottom 84 molds around the preform, the filler 60 pressurizes the preform with a second pressure sufficient to expand the preform to fill the molds. This causes the preform to be significantly stretched in a direction perpendicular to the longitudinal axis and minimally stretched along the longitudinal axis.

The first pressure may be approximately 1 to 50 pounds per square inch (7 to 345 kilopascals) and the second pressure may be at least 10 pounds per square inch (70 kilopascals) depending on the characteristics of the plastic film used in the preform. The second pressure is preferably 10 to 200 pounds per square inch (70 to 1380 kilopascals) although in some cases much higher pressures may be used. The first and second pressures may be provided with pressurized gas, such as air, fluid or flowable solid, such as a liquid or soft solid product to be provided in the container. If liquid or flowable solid is used in providing the pressures, a pressurized gas may be used to pressurize the liquid or solid.

Pressurizing the preform with the second pressure may use a pressurizing medium having a temperature of 140 to 250 degrees Fahrenheit (65 to 121 degrees Celsius) to facilitate the forming of the preform to the mold. The preform may further be filled with medium having a temperature of less than 65 degrees Fahrenheit (18 degrees Celsius) while the molds are closed to set the expanded preform. The cool medium may replace the heated pressurizing medium. The cool medium may be the product that fills the container.

Figure 9:
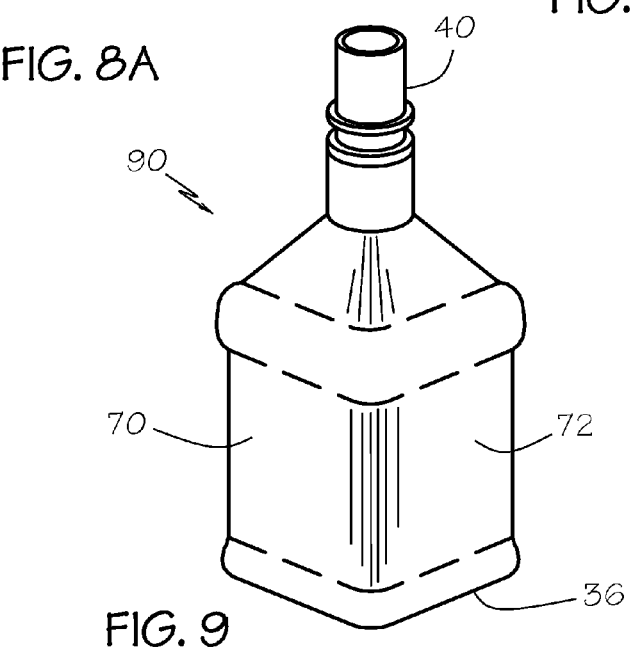
FIG. 9 is a perspective view of an exemplary container that embodies the invention.

FIG. 9 is a perspective view of an exemplary container 90 that embodies the invention.

While certain exemplary embodiments have been described and shown in the accompanying drawings, it is to be understood that such embodiments are merely illustrative of and not restrictive on the broad invention, and that this invention is not limited to the specific constructions and arrangements shown and described, since various other modifications may occur to those of ordinary skill in the art. The description is thus to be regarded as illustrative instead of limiting.

What is claimed is:

1. A method for expanding a preform made from plastic film to form a container, the preform having a longitudinal axis that extends from an open top to a closed bottom, the method comprising:

pressurizing the preform with a first pressure sufficient to cause side walls of the preform to expand outwardly to increase a width of the preform transversely to the longitudinal axis, and to cause the bottom of the preform to be drawn inwardly to reduce the length of the preform along the longitudinal axis;

closing side molds around the side walls of the preform;

closing a bottom mold to adjoin or be adjacent to the inwardly drawn bottom of the preform after pressurizing the preform with the first pressure and thereby forming a mold cavity having a length that is substantially the same as the reduced length of the of the preform; and pressurizing the preform with a second pressure sufficient to stretch the plastic film and expand the preform to fill the closed molds and thereby providing the expanded preform with a length that is not substantially greater than the reduced length of the preform.

2. The method of claim 1 wherein closing side molds is performed after pressurizing the preform with the first pressure.

3. The method of claim 1 wherein closing side molds is performed before pressurizing the preform with the first pressure.

4. The method of claim 1 wherein pressurizing the preform with the first pressure further comprises pressurizing the preform with air having a pressure of 1 to 50 pounds per square inch (7 to 345 kilopascals).

5. The method of claim 1 pressurizing the preform with the second pressure further comprises pressurizing the preform with fluid having a pressure of at least 10 pounds per square inch (70 kilopascals).

6. The method of claim 1 wherein pressurizing the preform with the second pressure further comprises filing the preform with fluid, and then pressurizing the preform with a gas having a pressure of at least 10 pounds per square inch (70 kilopascals).

7. The method of claim 1 wherein pressurizing the preform with the second pressure further comprises pressurizing the preform with fluid having a temperature of 140 to 250 degrees Fahrenheit (65 to 121 degrees Celsius).

8. The method of claim 1 further comprising filing the preform with fluid having a temperature of less than 65 degrees Fahrenheit (18 degrees Celsius) while the molds are closed.

* * * * *